United States Patent [19]

Burkdoll

[11] 4,272,102
[45] Jun. 9, 1981

[54] COUPLING DEVICE FOR IGNITIVE REACTIONS

[75] Inventor: Frank B. Burkdoll, Fairfield, Calif.

[73] Assignee: Explosive Technology, Inc., Fairfield, Calif.

[21] Appl. No.: 931,601

[22] Filed: Aug. 7, 1978

[51] Int. Cl.³ .................... B60R 21/02; F42C 19/00
[52] U.S. Cl. ................................ 280/731; 102/530;
  280/734; 280/736; 285/272
[58] Field of Search .............. 280/731, 728, 734, 736,
  280/741; 102/27 R, 280, 39; 285/136, 272, 425

[56] References Cited

U.S. PATENT DOCUMENTS

| 1,000,505 | 8/1911 | Frykberg | 285/272 X |
|---|---|---|---|
| 3,209,692 | 10/1965 | Webb | 102/280 X |
| 3,525,536 | 8/1970 | Pruneski | 280/731 |
| 3,552,769 | 1/1971 | Kemmerer et al. | 280/734 |
| 3,590,739 | 7/1971 | Persson | 102/27 R |
| 3,663,035 | 5/1972 | Norton | 280/734 |
| 3,787,075 | 1/1974 | Francis | 280/731 |
| 3,942,444 | 3/1976 | Greene | 102/280 X |
| 4,023,493 | 5/1977 | Austin et al. | 102/27 R X |

FOREIGN PATENT DOCUMENTS 267312  9/1929  Italy ........................... 285/272

Primary Examiner—John A. Pekar
Assistant Examiner—Milton L. Smith
Attorney, Agent, or Firm—Flehr, Hohbach, Test, Albritton & Herbert

[57] ABSTRACT

Device for coupling an ignitive reaction or percussive shock wave to a relatively movable body member such as an airbag mounted on the steering wheel of an automobile. The device includes first and second relatively movable body members with a transmission channel for ignitive reactions in one of the body members. Pyrotechnic transmission lines are connected to the body members with the gas channels of the transmission lines positioned for communication with the transmission channel notwithstanding relative movement of the body members.

10 Claims, 4 Drawing Figures

U.S. Patent
Jun. 9, 1981
4,272,102
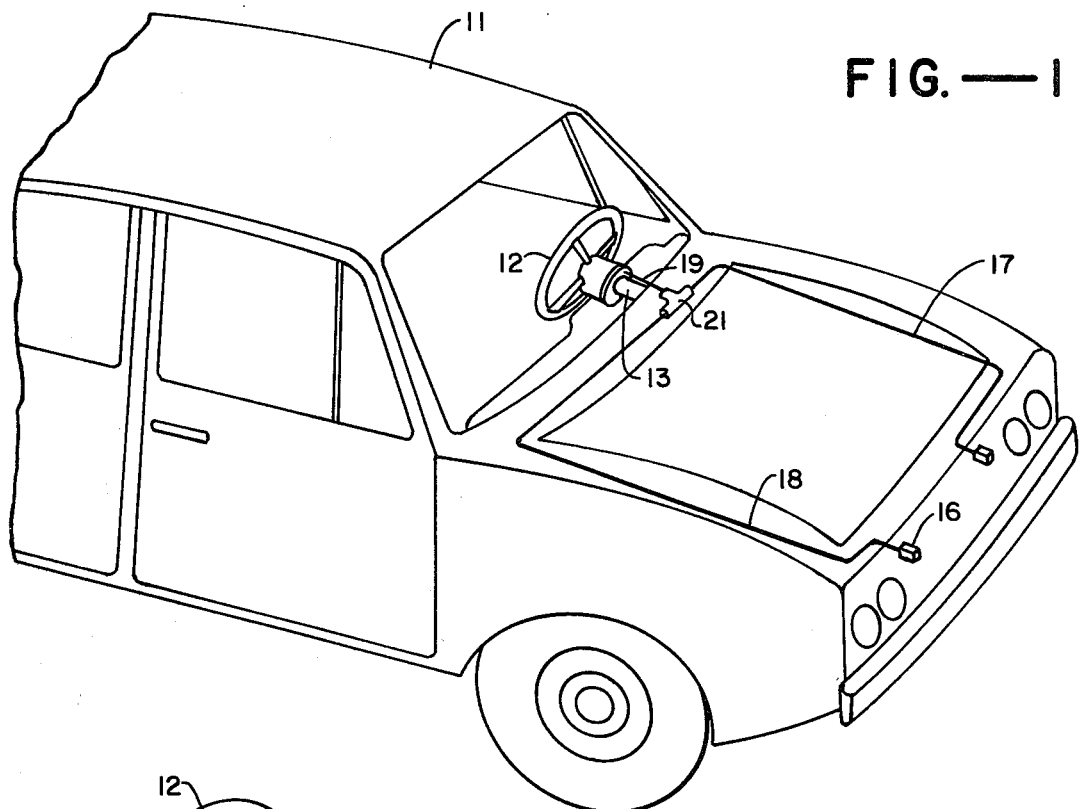
FIG.—1
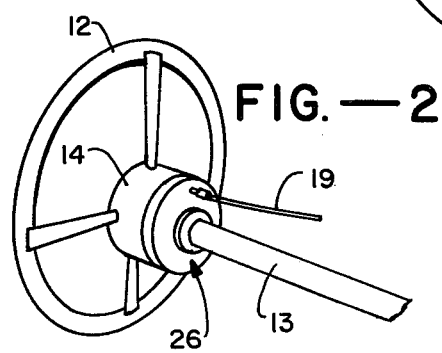
FIG.—2
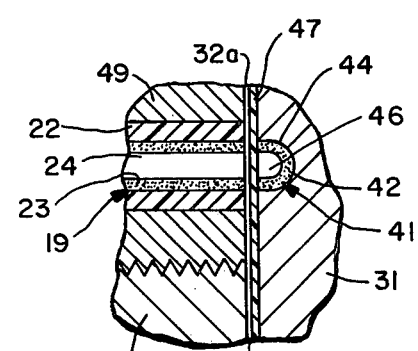
FIG.—4
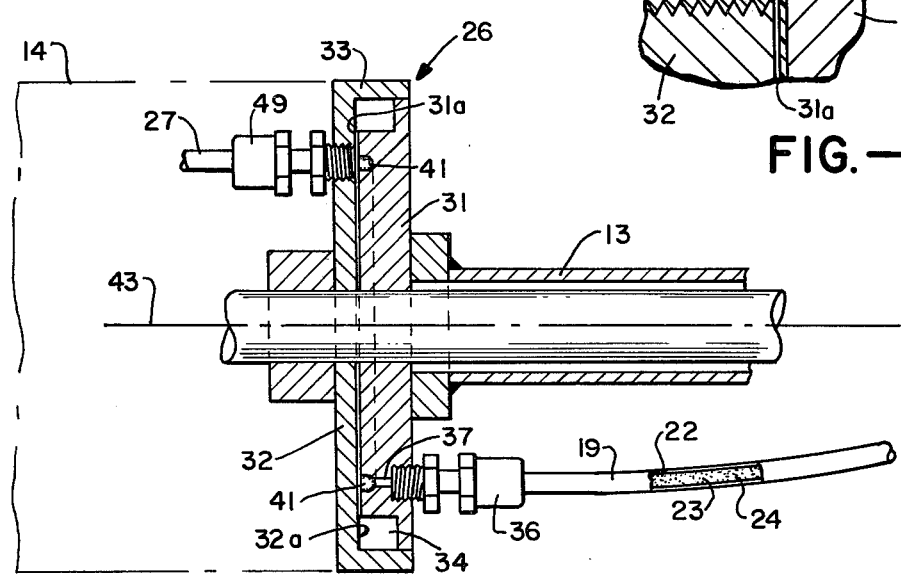
FIG.—3

COUPLING DEVICE FOR IGNITIVE REACTIONS

BACKGROUND OF THE INVENTION

This invention pertains generally to pyrotechnic systems and more particularly to systems in which an ignitive reaction or shock wave is transmitted to a relatively movable body such as an airbag mounted on an automotive steering wheel.

Pyrotechnically fired airbags have recently been developed as an alternative to earlier systems in which inflation of an airbag was initiated by the firing of an electrically actuated squib. Instead of electrical impact sensors and electrical conductors interconnecting the sensors and squib, a pryotechnic system utilizes a mechanical sensor which fires a percussion primer and a shock tube or pyrotechnic transmission line for transmitting the ignitive reaction or percussive wave from the primer to the gas generator associated with the airbag. Pyrotechnic systems have certain advantages over electrical airbag systems in that they operate independently of electrical power sources and cannot be fired inadvertently by electrical disturbance or electromagnetic radiation. Moreover, a pryotechnic system provides long term reliability, requires very little maintenance and is relatively safe to manufacture and install since there is no electric squib to be fired inadvertently.

One problem with a pryotechnic system such as an airbag system is the difficulty of coupling the ignitive reaction or shock wave between a relatively stationary portion of the system and a relatively movable portion such as an airbag and gas generator mounted on the steering wheel. One prior art system uses a length of shock-tube cord or transmission line wrapped about the steering wheel hub and a detonator mounted on the steering column for igniting the cord.

SUMMARY AND OBJECTS OF THE INVENTION

The invention provides a device for coupling an ignitive reaction between two relatively movable bodies such as the steering column and a wheel mounted automotive airbag system. The device includes first and second relatively movable body members with a transmission channel for ignitive reactions formed in one of the body members. Pyrotechnic transmission lines are connected to the body members with the gas channels of the transmission lines positioned for communication with the transmission channel in any relative position of the body members.

It is in general an object of the invention to provide a new and improved device for coupling an ignitive reaction or percussive shock wave between two relatively movable bodies.

Another object of the invention is to provide a coupling device of the above character which is particularly suitable for use in a pyrotechnic automotive airbag system.

Additional objects and features of the invention will be apparent from the following description in which one presently preferred embodiment is set forth in detail in conjunction with the accompanying drawings.

BRIEF DESCRIPTION OF THE DRAWINGS

FIG. 1 is a fragmentary isometric view, somewhat schematic, of an automobile have a pyrotechnic airbag system incorporating the invention.

FIG. 2 is an enlarged fragmentary isometric view of the steering wheel and a portion of the steering column of the automobile of FIG. 1.

FIG. 3 is a centerline sectional view of one embodiment of an ignitive reaction coupling device according to the invention.

FIG. 4 is an enlarged fragmentary sectional view of a portion of the coupling device of FIG. 3.

DESCRIPTION OF THE PREFERRED EMBODIMENT

In the drawings, the invention is illustrated in conjunction with an automobile 11 having a steering wheel 12 mounted on a steering column 13. An inflatable airbag and a pyrotechnically actuated gas generator (not shown) are mounted in the hub portion of the steering wheel, the gas generator being connected to the airbag for inflating the same. Impact sensors 16, 16 are positioned toward the front of the vehicle and connected to the elements mounted on the steering wheel by pyrotechnic transmission lines or shock tubes 17-19 and a T-connector 21. The impact sensors comprise percussion primers and means for firing the primers upon a predetermined change in the velocity and/or acceleration of the vehicle. The transmission lines can be of the type described in U.S. Pat. No. 3,590,739 and each comprises a hollow tube 22 having a coating of exothermal material 23 on the inner wall surface thereof with a central gas channel 24 for propagating the ignitive reaction or shock wave initiated by firing of the primer.

At the steering wheel, a coupling device 26 is provided for transmitting the ignitive reaction from transmission line 19 to a transmission line 27 connected to the gas generator. Transmission line 27 is similar in structure to transmission line 19, but it is carried by the steering wheel and rotates therewith, whereas transmission line 19 is carried by the steering column and is relatively stationary. Thus, the coupling device provides means for transmitting the ignitive reaction or shock wave between relatively movable transmission lines 19, 27.

The coupling device comprises a pair of relatively movable rigid body members 31, 32, with body member 31 being mounted on steering column 13 in a relatively stationary position and body member 32 being affixed to the hub portion of steering wheel 12 for rotation with the steering wheel. The body members are positioned coaxially of the steering wheel and column, with radial faces 31a, 32a in close facing proximity. Body member 32 includes a generally cylindrically peripheral flange 33 which defines a recessed area 34 within which body member 31 is received. If desired, a suitable bearing (not shown) can be provided to facilitate relative rotation of the two body members.

Transmission line 19 is connected to body member 31 by a fitting 36 which is threadedly received in the body member. An inlet port or passageway 37 is formed in the body member in communication with the gas channel of the transmission line.

A transmission channel 41 for the ignitive reaction or shock wave is formed in body member 31 in communication with inlet port 37. This channel comprises a groove or slot 42 which opens through surface 31a and extends along a generally circular path centered at the axis of rotation 43 of the steering wheel. A layer or coating of exothermal material 44 is applied to the wall of groove 42, and a gas channel 46 extends throughout the groove adjacent to the exothermal material. The open side of the transmission channel is closed by a seal 47 which overlies the channel and is affixed to surface 31a of the body member. The seal comprises a relatively thin (e.g. 0.003 inch or less) sheet of a material such as Mylar which is readily ruptured by the ignitive reaction in the transmission channel. In the preferred embodiment, the exothermal material in channel 41 is the same type of material that is used for the exothermal coatings of the transmission lines, and the cross sectional dimensions of channel 41 are generally the same as the corresponding dimensions of the transmission lines. Thus, the width of groove 42 is roughly equal to the inside diameter of tube 23, coating 44 has approximately the same thickness as coating 23, and gas channel 46 is generally equal in cross sectional area to channel 24. Suitable exothermal materials include pentaerythritoltetranitrate, cyclotrimethylenetrinitramine, cyclotetramethylenetetranitramine, trinitrotoluene, dinitroethylurea, tetryl, or a mixture of two or more of said substances.

Transmission line 27 is connected to body member 32 by means of a fitting 49 which is threadedly received in the body member. This fitting is positioned the same distance from axis of rotation 43 as is transmission channel 41, and the gas channel in transmission line 27 is aligned for communication with channel 41 regardless of the rotational position of the steering wheel.

Operation and use of the invention can be described briefly. It is assumed that a pyrotechnic airbag system incorporating the invention is installed in an automobile as illustrated in FIG. 1. An impact of predetermined magnitude will cause one of the percussion primers in sensors 16 to fire, producing a shock wave or ignitive reaction which is propagated through transmission line 17 or 18 to transmission line 19. The ignitive reaction in transmission 19 ignites the exothermal material in transmission channel 41, and the reaction is propagated rapidly around this channel, rupturing the seal which covers the channel. The ignition of the material in channel 41 adjacent to transmission line 27 ignites the material in that line, which then transmits the reaction to the ignitor fuse of the gas generator. The airbag is quickly inflated by gas produced by the generator.

The invention has a number of important features and advantages. While it has been described with specific reference to an automotive airbag system, it is equally applicable to other types of pyrotechnic systems in which an ignitive reaction or shock wave is to be transmitted between two relatively movable bodies.

It is apparent from the foregoing that a new and improved coupling device for ignitive reactions has been provided. While only one presently preferred embodiment has been described in detail, as will be apparent to those familar with the art, certain changes and modifications can be made without departing from the scope of the invention as defined by the following claims.

What is claimed is:

1. In a device for coupling an ignitive reaction between two transmission lines having gas channels through which the reaction is propagated: first and second relatively movable body members, means for connecting the transmission lines to respective ones of the body members, and a transmission channel in one of the body members in communication with the gas channel of the transmission line connected thereto and aligned for communication with the gas channel of the transmission line connected to the other body member during relative movement of the two body members, said transmission channel containing an exothermal material which is ignited by the reaction in one of the transmission lines, and a gas channel adjacent to the exothermal material for propagating the reaction to the other transmission line.

2. The coupling device of claim 1 wherein the one body member has a surface in facing relationship with the other body member and the transmission channel comprises a groove opening through said surface.

3. The coupling device of claim 1 wherein the body members are relatively rotatable and the transmission channel extends along a circular path centered at the axis of rotation.

4. In a device for coupling an ignitive reaction between two transmission lines having gas channels through which the reaction is propagated: first and second relatively rotatable body members having facing surfaces in close proximity, a groove opening through the facing surface of the first body member and extending along a generally circular path centered at the axis of rotation, an exothermal material in the groove, a gas channel adjacent to the exothermal material and opening through the facing surface of the first body member, and means for connecting the transmission lines to the body members with the gas channels of the transmission lines positioned for communication with the gas channel in the first body member.

5. The coupling device of claim 4 together with a layer of material sealing the transmission channel and adapted to be ruptured by an ignitive reaction in the channel.

6. In an automotive airbag system having a steering wheel mounted airbag and gas generator, a pyrotechnic crash detector located remotely of the airbag and generator, and pyrotechnic transmission lines connected to the crash detector and gas generator, the improvement comprising: a first body member mounted on the steering column, a second body member affixed to the steering wheel for rotation relative to the first body member, a pyrotechnic transmission channel extending along a generally circular path disposed coaxially of the steering wheel in one of the body members, and means for connecting the transmission lines to the body members in position for communication with the transmission channel in the one body member, said transmission channel containing an exothermal material which is ignited by an ignitive reaction in one of the transmission lines, and a gas channel adjacent to the ignitive material for propagating the reaction to the other transmission line.

7. The system of claim 6 wherein the one body member includes a surface in facing relationship with the other body member and the transmission channel comprises a groove opening through said surface.

8. The device of claim 1 wherein the exothermal material is selected from the group consisting of pentaerythritoltetranitrate, cyclotrimethylenetrinitramine, cyclotetramethylenetetranitramine, trinitrotoluene, dinitroethylurea, tetryl, and combinations thereof.

9. The device of claim 4 wherein the exothermal material is selected from the group consisting of pentaerythritoltetranitrate, cyclotrimethylenetrinitramine, cyclotetramethylenetetranitramine, trinitrotoluene, dinitroethylurea, tetryl, and combinations thereof.

10. The system of claim 6 wherein the exothermal material is selected from the group consisting of pentaerythritoltetranitrate, cyclotrimethylenetrinitramine, cyclotetramethylenetetranitramine, trinitrotoluene, dinitroethylurea, tetryl, and combinations thereof.

* * * * *